June 15, 1943.     G. T. FELBECK     2,321,666
PROCESS FOR GAS SEPARATION
Filed Feb. 8, 1940
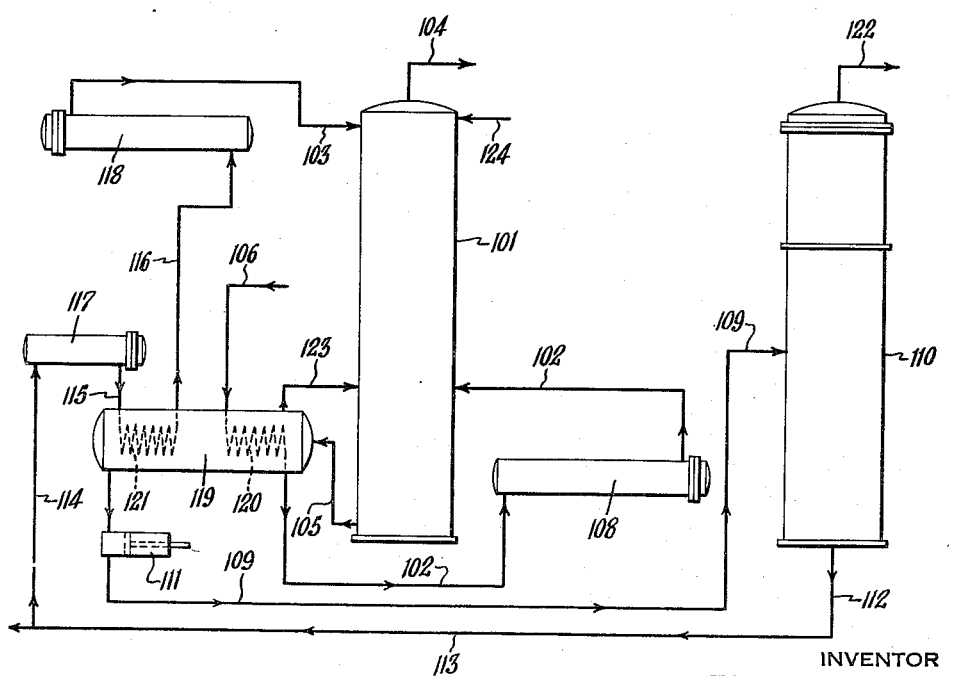
INVENTOR
GEORGE T. FELBECK
BY
ATTORNEY Patented June 15, 1943

2,321,666

UNITED STATES PATENT OFFICE 2,321,666

PROCESS FOR GAS SEPARATION

George T. Felbeck, Altadena, Calif., assignor to Carbide and Carbon Chemicals Corporation, a corporation of New York Application February 8, 1940, Serial No. 318,007

5 Claims. (Cl. 62—175.5)

The present invention is a process for the separation of ethane and ethylene from methane, or from normally gaseous mixtures comprising methane. The separation is effected, according to the present invention, without liquefaction of the methane, and at a pressure which may be substantially less than the critical pressure of methane. The methane thus separated as a gas from the ethane, ethylene, or a mixture of them, may be removed in admixture with other normally gaseous constituents contained in the gas mixture.

The present process is not limited in its usefulness, however, to the separation of ethane and ethylene from gaseous methane, but it may be adapted for separating from gaseous mixtures comprising a plurality of hydrocarbons, a component consisting of one or more of the hydrocarbons present therein. In any case, the separation is accomplished essentially without liquefaction of more volatile hydrocarbon which is additionally present in the mixture from which such component is to be separated.

The separation of ethane, and ethylene, from methane, for which the process of the invention is particularly useful, has heretofore been attended with more or less difficulty and disadvantage. Relatively low temperatures and high pressures have both been required in processes wherein resort is had to liquefaction of the methane by compression and removal of heat. Other disadvantages of processes involving the liquefaction of methane include the relatively high cost of effecting the separation, as well as the complex and expensive apparatus required.

The drawing is a flow diagram illustrative of a form of process by which a separation may be carried out continuously, and with reuse or recycling of fluid employed in the separation process.

The separation of a hydrocarbon component from hydrocarbon mixtures is effected according to the present invention by bringing the hydrocarbon mixture in the gaseous state into contact with a scrubbing liquid and converting the hydrocarbon component from the gaseous mixture to the liquid phase under such conditions of temperature and pressure as do not favor the conversion of lower boiling constituents to the liquid phase. The hydrocarbon component which is thus separated from the gaseous mixture forms with the scrubbing liquid, a liquid product having a composition and other characteristics which are different from those of the scrubbing liquid. The scrubbing liquid may be brought into contact with the gaseous mixture in any suitable vessel adapted for bringing a liquid and gas into intimate contact, such as a column provided with baffles or trays.

For the more complete separation of the hydrocarbon component from the gas mixture, the scrubbing liquid should be correspondingly free of the one or more hydrocarbons composing the component undergoing conversion to the liquid phase. To this end, it is of primary importance in the present invention to select a scrubbing liquid having a volatility such that it is capable of being readily and economically freed of the component to be separated from the gas mixture. Similarly, the liquid product formed in accordance with the present invention should also have a volatility sufficient to permit of the convenient and economical recovery therefrom of the component converted to the liquid phase. For this purpose, it is also of primary importance to select a scrubbing liquid having such characteristics, including composition, that the unvaporized scrubbing liquid flowing through the column is well adapted to form, with the separated component, a liquid product from which the separated component can be removed under conditions of temperature and pressure which are conveniently and economically attainable.

For the more complete separation the scrubbing liquid should also be sufficiently volatile so that the liquid product which is formed in the process may have a volatility which is high enough to permit of the convenient expulsion therefrom of any hydrocarbon present which is more volatile than the separated component. The expulsion may be carried out prior to the recovery of the separated component from the liquid product, and at relatively low temperatures where polymerization of any unsaturated hydrocarbons present may be avoided, or at least not unduly accelerated.

After the separated hydrocarbon component has been recovered from the liquid product under conditions of temperature and pressure which are conveniently and economically attainable, the residue of that liquid may be used as scrubbing liquid, particularly where economy of material may be an important factor. Additionally, the conditions of temperature and pressure under which the separated component may be recovered from the liquid product make it possible to employ such residue as scrubbing liquid with economy of power and refrigeration in restoring it to those conditions of temperature and pressure maintained or permitted to prevail in the column. Thus, the present process lends itself favorably to adaptation for reuse and for recycling of fluids employed therein.

The temperatures at which the gaseous mixture and scrubbing liquid are brought into contact may be as low as about —100° C., which temperatures are conveniently attainable with ethane or ethylene refrigeration at a pressure of about one atmosphere. If still lower temperatures are desired, methane refrigeration may be employed. While the temperature should preferably be not higher than about 0° C. to about 30° C., it must in any event be not higher than the critical temperature of the liquid product of the composition to be formed in contact with the gas mixture. By critical temperature of the liquid product is meant herein the empirical value which may be calculated by regarding the critical temperature of the particular hydrocarbons as a function of their molecular weights, and assigning to the liquid a value for molecular weight, as if it consisted of a single hydrocarbon. The assigned value for molecular weight, which need not necessarily be a whole number, is arrived at from the proportions of the individual hydrocarbons composing the liquid and their respective molecular weights. The composition of the liquid product in turn is determined according to the conditions under which the gas mixture and the scrubbing liquid are brought into contact and the degree of separation it is desired to effect.

While the pressure at which the separation is carried out is preferably greater than normal or atmospheric pressure, it must, in any case, be less than the critical pressure of methane (45.7 atmospheres, absolute; 672 pounds per square inch, absolute), and preferably of the one or more hydrocarbons of which the component to be separated consists. At pressures approaching the critical pressure of these hydrocarbons, a separation according to the process of the present invention becomes relatively difficult, if not impossible, because the density in the gaseous phase, at pressures approaching the critical pressures, becomes about the same for all such hydrocarbons at about the preferred temperatures of separation, or not far below. The optimum pressure for any particular degree of separation it is desired to effect is dependent on a number of factors, including the temperature, the desired composition of the liquid product, the volatility of the scrubbing liquid and of the component to be separated, and on the quantity of the scrubbing liquid used in relation to the quantity of gas mixture. In general, the more volatile the liquid product, and the less the amount of scrubbing liquid used relative to the gas mixture, the higher the pressure it may be desirable to employ within the specified limits in order to bring about a more complete separation.

In order to facilitate the separation from the gas mixture of the hydrocarbon component to be removed therefrom, the heat liberated on conversion of the latter to the liquid phase, or any part thereof, may be withdrawn by cooling of either the liquid or the gas phases or both, within the limits of the temperatures previously specified. When the desired or required temperature of operation does not permit of cooling by the atmosphere (or by available cooling water), it may be expedient to maintain such temperature by refrigeration. Another of the advantages of the present process which may be mentioned in this connection is that any such temperatures to be maintained by refrigeration are conveniently obtainable by the use of methane, ethane or propane, and readily attainable with economy of non-circulating refrigeration requirements in comparison with previous processes.

A way in which the process of the present invention may be employed for the separation of a hydrocarbon component from a normally gaseous mixture is described with reference to the flow diagram of the drawing by way of example.

A normally gaseous mixture from any suitable source is supplied through the pipe 106, and is conducted to the column 101 through the pipe 102. If it is desired to absorb or utilize the readily available heat of the gas mixture, a heat exchange vessel 108 may be interposed in the path of the gas mixture flowing to the column 101. The heat exchange vessel 108 may be a propane boiler, for instance, in which the available heat content of the gas mixture is utilized in vaporizing propane liquid under a suitable pressure.

The liquid product of the composition formed in the column 101 may be withdrawn, near the lower part thereof, through the pipe 105, and treated in a rectifying column 110 to recover the hydrocarbon component separated from the gas mixture. This liquid product is supplied to the rectifying column through the pipe 109. A pump 111 may be provided for moving the liquid. The thus recovered component may be withdrawn from the rectifying column through the pipe 122.

After rectification, the residue of the liquid product may be withdrawn from the rectifying column through the pipe 112. According to the degree of rectification employed, this residue of liquid product may be substantially, if not entirely, free of the hydrocarbon component, as well as any more volatile hydrocarbon separated from the gas mixture. If sufficiently free of such hydrocarbon, the residue may be conveyed through the pipes 113, 114, 115, 116 and 103 and introduced into the column 101, near the top thereof, as scrubbing liquid. Heat exchange vessels 117 and 118 may be interposed in the path to utilize the available heat of the scrubbing liquid flowing to the substitution column. Both vessels may be of the conventional shell and tube construction, and employ any suitable medium for transfer or absorption of heat. For instance, in heat exchanger 117 the available heat might be utilized in increasing the sensible heat of water or other fluid of suitable temperature, while in heat exchanger 118 the heat might be utilized in vaporizing a low boiling substance such as propane.

Prior to the recovery of the hydrocarbon component, constituents more volatile than such component may be expelled from the liquid product. This prior expulsion may be carried out in a separate kettle or vessel 119 into which the liquid product may be conveyed after withdrawal from the column. This kettle, which may be termed the liquid product kettle, may be provided with one or more coils for the transfer of heat to the liquid product. For instance, the normally gaseous mixture which is being supplied through the pipe 106 may be brought into heat exchange relationship with the liquid product by passing the gas through the coil 120 prior to its entry into the column.

Additionally, the scrubbing liquid which is being supplied to the column 101 may be allowed to yield up heat to the liquid product by passing the scrubbing liquid through a coil 121, prior to the entry of the scrubbing liquid into the column. Such utilization of heat of the scrubbing liquid, or of the gas mixture, or both, by transferring the heat to the liquid product, may supplement other provision made for transfer of heat to or from the fluids, as the case may be, and may result in considerable economy by way of transfer of quantities of heat to parts of the system where they may be absorbed with more or less advantage to the whole system.

The kettle 119 may be vented in any suitable manner for the removal of hydrocarbon vapor generated therein. It may be connected as by the pipe 123 for the return of hydrocarbon vapor to the column 101. Under certain circumstances, it may be found desirable to transfer more or less completely the function of the kettle 119 to a lower extension of the column by making suitable provision therein for the transfer of heat to the liquid product.

It has been found that a $C_3$-hydrocarbon liquid is especially well suited for use as a scrubbing liquid when a $C_2$-hydrocarbon component is to be separated from methane contained in a normally gaseous mixture. The term $C_3$-hydrocarbon, as here used in connection with the scrubbing liquid, refers to propane, propylene or a mixture of them. Similarly, the term $C_2$-hydrocarbon as used here refers to ethane, ethylene or a mixture of them. In addition to the methane and the $C_2$-hydrocarbon, the normally gaseous mixture may possibly contain other constituents, among which the following are mentioned here, merely by way of example and not by way of exclusion: hydrogen, carbon monoxide, carbon dioxide, and hydrocarbons, such as propane, propylene, butane, butylene, pentane, pentene, and the like.

The use of $C_3$-hydrocarbon as scrubbing liquid is particularly advantageous in that the rectification and expulsion carried out on bottom liquid, formed in the separation of $C_2$-hydrocarbon liquid according to the present invention, may be carried out at such temperatures that polymerization of any unsaturates present does not take place, or at least is not unduly accelerated.

That the process of the present invention is applicable with advantage to normally gaseous mixtures of hydrocarbons generally, including both natural gas and manufactured gas, will be apparent from the following examples:

EXAMPLE I

The process has been found well suited, for example, for the separation of a $C_2$-hydrocarbon component from methane contained in a manufactured gas of the following composition:

*Gas mixture*

| | Per cent |
|---|---|
| Methane | 18.6 |
| Ethylene | 37.9 |
| Ethane | 17.5 |
| Propane | 0.3 |
| Propylene | 0.7 |
| Butylene | 0.1 |
| Hydrogen | 24.3 |
| Carbon monoxide | 0.5 |
| Carbon dioxide | 0.1 |
| | 100.0 |

A gaseous methane remainder separated from the above gas mixture by the process of the present invention was found, upon analysis, to have the following composition:

*Gaseous methane remainder*

| | Per cent |
|---|---|
| Methane | 36.8 |
| Ethane | 1.1 |
| Ethylene | 0.2 |
| Propane | 2.6 |
| Propylene | 4.7 |
| Butylene | 0.0 |
| Hydrogen | 53.6 |
| Carbon monoxide | 1.0 |
| Carbon dioxide | 0.0 |
| | 100.0 |

The $C_3$-hydrocarbon liquid employed as scrubbing liquid was of the following composition, as determined by analysis:

*Scrubbing liquid*

| | Per cent |
|---|---|
| Ethane | 0.7 |
| Ethylene | 0.4 |
| Propane | 28.2 |
| Propylene | 47.3 |
| Butylene | 17.6 |
| Butane | 5.2 |
| Pentanes and pentenes | 0.4 |
| Non-hydrocarbon gases | 0.2 |
| | 100.0 |

The gas mixture and the scrubbing liquid were brought into contact at a gauge pressure of about 250 pounds per square inch. The scrubbing liquid was supplied at the rate of 19.8 gallons per 1000 cubic feet, at standard conditions, of feed (gas mixture).

The liquid product was found, upon analysis, to have the following composition:

*Liquid product*

| | Per cent |
|---|---|
| Methane | 4.7 |
| Ethane | 19.1 |
| Ethylene | 41.6 |
| Propane | 11.8 |
| Propylene | 19.8 |
| Butane | 0.1 |
| Butylene | 2.1 |
| Pentanes and pentenes | 0.8 |
| | 100.0 |

EXAMPLE II

In another separation carried out by the process of this invention, the gas mixture yielded the following analysis:

*Gas mixture*

| | Per cent |
|---|---|
| Methane | 23.2 |
| Ethane | 19.5 |
| Ethylene | 33.2 |
| Propane | 0.0 |
| Propylene | 0.0 |
| Hydrogen | 23.5 |
| Carbon monoxide | 0.3 |
| Carbon dioxide | 0.3 |
| | 100.0 |

The gaseous methane remainder separated from the above gas mixture was found to have a composition as follows, upon analysis:

*Gaseous methane remainder*

| | Per cent |
|---|---|
| Methane | 41.6 |
| Ethane | 0.6 |
| Ethylene | 3.5 |
| Propane | 1.9 |
| Propylene | 3.3 |
| Hydrogen | 47.6 |
| Carbon monoxide | 1.5 |
| Carbon dioxide | 0.0 |
| | 100.0 |

The volatile scrubbing liquid, comprising principally $C_3$-hydrocarbon liquid, which was brought into contact with the gas mixture had the following composition, as established by analysis:

*Scrubbing liquid*

| | Per cent |
|---|---|
| Ethane | 0.5 |
| Ethylene | 0.9 |
| Propane | 28.8 |
| Propylene | 49.8 |
| Butane | 7.4 |
| Butylene | 12.1 |
| Pentanes and pentenes | 0.5 |
| | 100.0 |

In the above separation, the scrubbing liquid was supplied at the rate of 9.35 gallons per 1000 cubic feet, at standard conditions, of feed. The gauge pressure was at about 255 pounds per square inch.

The composition of the liquid product formed during contact of the above gas mixture was determined, and the following results obtained:

*Liquid product*

| | Per cent |
|---|---|
| Methane | 2.9 |
| Ethane | 27.8 |
| Ethylene | 42.4 |
| Propane | 9.4 |
| Propylene | 13.7 |
| Butane | 1.5 |
| Butylene | 1.8 |
| Pentanes and pentenes | 0.5 |
| | 100.0 |

After partial rectification of the liquid product for removal of the methane, the liquid had the following composition:

*Partially rectified liquid product*

| | Per cent |
|---|---|
| Methane | 0.0 |
| Ethylene | 35.4 |
| Ethane | 27.3 |
| Propylene | 18.5 |
| Propane | 12.6 |
| Butylene | 3.7 |
| Butane | 2.2 |
| Pentanes, pentenes and higher | 0.3 |
| | 100.0 |

EXAMPLE III

In still another separation by the process of this invention, an analysis of the gas mixture (feed) revealed the following composition:

*Gas mixture*

| | Per cent |
|---|---|
| Methane | 18.5 |
| Ethane | 21.6 |
| Ethylene | 31.2 |
| Propane | 0.1 |
| Propylene | 0.0 |
| Hydrogen | 27.7 |
| Carbon monoxide | 0.8 |
| Carbon dioxide | 0.1 |
| | 100.0 |

Analysis of the crude methane gas separated from the above gas mixture gave the composition as follows:

*Gaseous methane remainder*

| | Per cent |
|---|---|
| Methane | 38.1 |
| Ethane | 0.5 |
| Ethylene | 1.9 |
| Propane | 2.5 |
| Propylene | 4.7 |
| Hydrogen | 51.7 |
| Carbon monoxide | 0.5 |
| Carbon dioxide | 0.1 |
| | 100.0 |

In the separation illustrated by this example, the scrubbing liquid, which again comprised mainly propane and propylene, was supplied at the rate of 14.8 gallons per 1000 cubic feet, at standard conditions, of feed. The pressure was maintained at about 250 pounds per square inch, gauge.

The composition of the liquid formed in contact with the gas mixture was determined, by analysis, after removal from contact with the latter. The results obtained were as follows:

*Liquid product*

| | Per cent |
|---|---|
| Methane | 3.3 |
| Ethane | 23.0 |
| Ethylene | 34.0 |
| Propane | 11.1 |
| Propylene | 21.7 |
| Butane | 1.9 |
| Butylene | 4.6 |
| Pentanes and pentenes | 0.4 |
| | 100.0 |

After treatment to expel the methane, the liquid had the following composition:

*Partially rectified liquid product*

| | Per cent |
|---|---|
| Methane | 0.7 |
| Ethane | 22.5 |
| Ethylene | 31.3 |
| Propane | 12.5 |
| Propylene | 25.3 |
| Butane | 2.8 |
| Butylene | 4.9 |
| | 100.0 |

Although, in the separations illustrated by the above examples, the temperatures of the gas mixtures and volatile scrubbing liquids employed were maintained, during contact, at about −30° C., higher or lower temperatures can also be used without affecting adversely the degree of separation it is possible to obtain by the present method.

Temperatures as high as about 0° C. and as low as about −100° C. have been successfully used. At temperatures below those used in the above examples, the amount of scrubbing liquid employed may be diminished while achieving a no less complete separation.

EXAMPLE IV

In this example the temperature of the column was maintained at about −42° C., and the separation carried out at a pressure of about 229 pounds per square inch, absolute. The manufactured gas supplied to the column was a gas mixture of substantially the following composition, as determined by analysis, in terms of percent by volume.

*Gas mixture*

| | Per cent |
|---|---|
| Methane | 16.8 |
| Ethane | 17.0 |
| Ethylene | 28.5 |
| Propane | 2.5 |
| Propylene | 7.6 |
| Butane, butene and higher | 3.7 |
| Hydrogen | 22.7 |
| Carbon monoxide | 1.0 |
| Carbon dioxide | 0.2 |
| | 100.0 |

After a separation was carried out in accordance with the principles of the present invention, the remainder of the gas mixture was found by analysis to have a composition about as follows; in terms of percent by volume:

*Gaseous remainder*

| | Per cent |
|---|---|
| Methane | 43.1 |
| Ethane | 0.4 |
| Ethylene | 0.4 |
| Propylene | 4.0 |
| Propane | 1.2 |
| Hydrogen | 50.1 |
| Carbon monoxide | 0.7 |
| Carbon dioxide | 0.1 |
| | 100.0 |

The volatile hydrocarbon liquid which was brought into contact with the gas mixture, was of the following composition; in terms of percent by volume in the gas phase:

*Scrubbing liquid*

| | Per cent |
|---|---|
| Hydrogen | |
| Methane | 0.3 |
| Carbon monoxide | |
| Ethane | 1.0 |
| Ethylene | 0.5 |
| Propane | 18.0 |
| Propylene | 46.7 |
| Butane | 10.0 |
| Butylene | 22.6 |
| Pentane, pentene and higher | 0.8 |
| Carbon dioxide | 0.1 |
| | 100.0 |

This scrubbing liquid was supplied to the column at the rate of about 17.06 gallons per 1000 cubic feet (at standard conditions) of gas mixture, and the resulting liquid product was of the following composition; in terms of percent by volume, in the gas phase:

*Liquid product*

| | Per cent |
|---|---|
| Methane | 3.6 |
| Ethane | 14.1 |
| Ethylene | 25.3 |
| Propylene | 27.0 |
| Propane | 11.4 |
| Butane | 4.7 |
| Butene | 13.3 |
| Pentane, pentene and higher | 0.4 |
| Carbon dioxide | 0.2 |
| | 100.0 |

EXAMPLE V

In this example the separation was carried out at a pressure of 235 pounds per square inch, absolute, while the temperature of the column was maintained at a temperature of about −40° C. The furnace gas supplied to the column was of the following composition:

*Gas mixture*

| | Per cent |
|---|---|
| Methane | 18.8 |
| Ethane | 14.6 |
| Ethylene | 26.8 |
| Propane | 4.0 |
| Propylene | 10.1 |
| Butane | 3.1 |
| Butylene | 3.8 |
| Hydrogen | 18.8 |
| | 100.0 |

The scrubbing liquid was supplied to the column at a rate of about 19.5 gallons per 1000 cubic feet (at standard conditions) of gas mixture and had substantially the folowing composition expressed in percent by volume in the gas phase:

*Scrubbing liquid*

| | Percent |
|---|---|
| Methane | 0.2 |
| Ethane | 2.1 |
| Ethylene | 0.5 |
| Propane | 16.3 |
| Propylene | 45.1 |
| Butane | 10.6 |
| Butylene | 24.9 |
| Pentane, pentene and higher | 0.2 |
| Carbon dioxide | 0.1 |
| | 100.0 |

The gaseous remainder delivered from the column after the separation had been carried out according to the present process, had the following composition:

*Gaseous remainder*

| | Percent |
|---|---|
| Methane | 45.3 |
| Ethane | 1.4 |
| Ethylene | 1.1 |
| Propane | 1.9 |
| Propylene | 2.9 |
| Hydrogen | 46.9 |
| Carbon monoxide | 0.5 |
| | 100.0 |

The resulting liquid product which was formed during contact of the scrubbing liquid with the gas mixture had the following composition; in terms of volume percent in the gaseous phase:

*Liquid product*

| | Percent |
|---|---|
| Methane | 2.0 |
| Ethane | 13.3 |
| Ethylene | 25.9 |
| Propane | 11.9 |
| Propylene | 32.1 |
| Butane | 4.1 |
| Butylene | 10.5 |
| Pentane, pentene and higher | 0.1 |
| Carbon dioxide | 0.1 |
| | 100.0 |

EXAMPLE VI

In this example the gas mixture and the scrubbing liquid were brought into contact at a pressure of about 165 pounds per square inch, absolute, and a temperature of about −40° C. maintained during such contact. The scrubbing liquid was supplied at the average rate of about 30 gallons per 1000 cubic feet (at standard conditions) of gas mixture.

The gases and liquids were of the following compositions, in terms of percent by volume in the gaseous phase:

*Gas mixture*

| | Percent |
|---|---|
| Hydrogen | 33.8 |
| Methane | |
| Ethane | 17.4 |
| Ethylene | 27.5 |
| Propane | 4.6 |
| Propylene | 10.2 |
| Butane | 1.9 |
| Butylene | 4.3 |
| Pentane, pentene and higher | 0.1 |
| Carbon dioxide | 0.1 |
| | 100.0 |

*Scrubbing liquid*

| | Percent |
|---|---|
| Ethane | 4.1 |
| Ethylene | 1.4 |
| Propane | 18.7 |
| Propylene | 42.3 |
| Butane | 8.2 |
| Butylene | 25.1 |
| Carbon dioxide | 0.2 |
| | 100.0 |

*Gaseous remainder*

| | Percent |
|---|---|
| Hydrogen | 33.0 |
| Carbon monoxide | 1.1 |
| Carbon dioxide | 0.1 |
| Methane | 57.0 |
| Ethane | 2.1 |
| Ethylene | 1.1 |
| Propane | 1.6 |
| Propylene | 4.0 |
| | 100.0 |

*Liquid product*

| | Percent |
|---|---|
| Methane | 2.0 |
| Ethane | 12.6 |
| Ethylene | 18.8 |
| Propane | 13.1 |
| Propylene | 29.9 |
| Butane | 6.8 |
| Butylene | 16.8 |
| | 100.0 |

EXAMPLE VII

In this run the gas mixture and the scrubbing liquid were brought into contact at a pressure of about 235 pounds per square inch, absolute, and the temperature during contact was about −32° C. The amount of scrubbing liquid supplied to the column averaged about 24 gallons per 1000 cubic feet (at standard conditions) of gas mixture.

The gases and liquids were found, upon analysis, to be of the following composition, in terms of percent by volume in the gaseous phase:

*Gas mixture*

| | Percent |
|---|---|
| Hydrogen | 17.8 |
| Methane | 14.8 |
| Carbon monoxide | 0.4 |
| Ethylene | 30.5 |
| Ethane | 18.7 |
| Carbon dioxide | 0.1 |
| Propylene | 8.8 |
| Propane | 4.8 |
| Butylene | 2.3 |
| Butane | 1.6 |
| Pentane, pentene and higher | 0.2 |
| | 100.0 |

*Scrubbing liquid*

| | Percent |
|---|---|
| Methane | 1.2 |
| Ethylene | 0.7 |
| Ethane | 1.4 |
| Propylene | 45.3 |
| Propane | 26.1 |
| Butylene | 18.2 |
| Butane | 7.0 |
| Pentane, pentene and higher | 0.2 |
| | 100.0 |

*Gaseous remainder*

| | Percent |
|---|---|
| Hydrogen | 28.4 |
| Methane | 55.5 |
| Carbon monoxide | 1.9 |
| Ethylene | 1.1 |
| Ethane | 2.0 |
| Carbon dioxide | 0.3 |
| Propylene | 7.5 |
| Propane | 3.2 |
| Butane, butene and higher | 0.1 |
| | 100.0 |

*Liquid product*

| | Percent |
|---|---|
| Methane | 1.4 |
| Ethylene | 25.5 |
| Ethane | 13.3 |
| Propylene | 30.4 |
| Propane | 15.5 |
| Butylene | 9.9 |
| Butane | 3.6 |
| Pentane, pentene and higher | 0.4 |
| | 100.0 |

In Examples IV, V, VI, and VII above, the gas mixture and the scrubbing liquid were in countercurrent flow for at least the major part of the contact period. While the greater part of the conversion from the gaseous phase to the liquid phase took place at the temperatures specified in each of the examples respectively, other temperatures which differ somewhat therefrom may be maintained or permitted to prevail where either the scrubbing liquid or the gas mixture is initially brought into contact with the other, without departing from the present invention. In any event, however, the temperatures where the gaseous mixture and the saturation liquid are brought into contact should be preferably within the range herein disclosed as suitable for carrying out the process of this invention.

The liquid product of the above examples may again be brought into contact with gas mixtures for separation of the latter into components, in accordance with the method of the present invention. Before being put to such use, however, it should first be rectified to free it of the one or more normally gaseous hydrocarbons which it is desired to separate from the gas mixture by conversion to the liquid phase. Where the composition after rectification permits of such a step, the rectified liquid may be added to, or used as, the scrubbing liquid, and recycled. Before rectifying the liquid product of the above examples to free it of C₂-hydrocarbons, for instance, it may first be subjected to a preliminary treatment or expulsion, to remove more or less of the methane. The methane thus removed may be returned to the column 101 and recycled, or otherwise utilized, in whole or in part.

It is to be understood that the term "normally gaseous hydrocarbon," wherever used in the present application, refers to hydrocarbons which are gaseous at the ordinary, or normal, temperatures and pressures, in accordance with the commonly accepted meanings of the terms. Similarly, the term "normal boiling temperature" is to be understood as referring to the boiling point at the normal, or atmospheric, pressure of about 14.7 pounds per square inch, absolute.

Other variations of the process of the present invention will be apparent to those skilled in the art without departing from the principles thereof, as, for example, the use and treatment, in accordance with the principles of the invention disclosed here, of volatile hydrocarbon liquids and of gas mixtures derived from diverse sources, and in conjunction with other processes.

I claim:

1. The continuous process for the separation of a non-acetylenic hydrocarbon having two carbon atoms to the molecule from gaseous mixtures additionally containing methane, which comprises bringing the gas mixture into contact with a volatile hydrocarbon liquid comprising mainly non-acetylenic hydrocarbon having three carbon atoms to the molecule and substantially free of hydrocarbon having less than three carbon atoms to the molecule, said contact taking place at a superatmospheric pressure less than the critical pressure of methane and at a temperature not higher than about 30° C.; converting said hydrocarbon having two carbon atoms to the molecule from the gas mixture to the liquid phase and forming with the volatile hydrocarbon liquid a liquid hydrocarbon product during said contact; simultaneously withdrawing heat from said hydrocarbon having two carbon atoms to the molecule while thus converting it to the liquid phase; separating said product from the gas mixture and rectifying it to recover therefrom hydrocarbon having two carbon atoms to the molecule; and, after rectification, bringing the liquid residue of said product into contact with a gaseous hydrocarbon mixture for separation of a normally gaseous component therefrom.

2. Process for the separation of a non-acetylenic hydrocarbon having two carbon atoms to the molecule from gaseous mixtures additionally containing methane, which comprises bringing the gas mixture into contact with a volatile hydrocarbon liquid comprising mainly non-acetylenic hydrocarbon having three carbon atoms to the molecule and substantially free of hydrocarbon having less than three carbon atoms to the molecule, said contact taking place at a superatmospheric pressure less than the critical pressure of methane and at a temperature not higher than about 30° C.; converting said non-acetylenic hydrocarbon having two carbon atoms to the molecule from the gas mixture to the liquid phase and forming with the volatile hydrocarbon liquid a liquid hydrocarbon product during said contact; separating said product from the gas mixture and treating it to expel dissolved methane from the product; thereafter rectifying the product to recover therefrom a hydrocarbon having two carbon atoms to the molecule; and, after rectification, bringing the liquid residue of said product into contact with a gaseous hydrocarbon mixture for separation of a normally gaseous component therefrom.

3. Process for the separation of a non-acetylenic hydrocarbon having two carbon atoms to the molecule from a normally gaseous mixture also containing, in a substantial amount, at least one constituent more volatile than such hydrocarbon, which comprises bringing such gaseous mixture into contact with a volatile hydrocarbon liquid having a normal boiling temperature not substantially higher than about 0° C., and substantially free of hydrocarbon having less than three carbon atoms to the molecule, said contact taking place under a pressure less than about 672 pounds per square inch, absolute, and at a temperature not higher than about 30° C.; converting said non-acetylenic hydrocarbon having two carbon atoms to the molecule from the gas mixture to the liquid phase and forming with the volatile hydrocarbon liquid a liquid hydrocarbon product during said contact; simultaneously withdrawing heat from the non-acetylenic hydrocarbon having two carbon atoms to the molecule while thus converting it to the liquid phase; separating said product from the gas mixture and treating it to expel dissolved constituent more volatile than said hydrocarbon; and rectifying the product to recover therefrom the hydrocarbon having two carbon atoms to the molecule.

4. In a continuous process for the separation of a normally gaseous hydrocarbon component of not less than two carbon atoms to the molecule from a hydrocarbon mixture additionally containing a constituent more volatile than such component, the steps which include bringing the hydrocarbon mixture in the gaseous state into contact with a volatile hydrocarbon scrubbing liquid having a normal boiling temperature not substantially above 0° C. and substantially free of said component; withdrawing heat from said component and converting it from said mixture in the gaseous state to the liquid phase during such contact to form with said scrubbing liquid, a liquid product; thereafter rectifying said liquid product to recover said hydrocarbon component; and bringing the liquid product, after rectification, into contact with a hydrocarbon mixture for separation therefrom of a hydrocarbon component.

5. In a process for the separation of a normally gaseous hydrocarbon component of not less than two carbon atoms to the molecure from a hydrocarbon mixture additionally containing a constituent which is more volatile than such component, the steps which include bringing the hydrocarbon mixture in the gaseous state into contact with a relatively volatile hydrocarbon scrubbing liquid having a normal boiling temperature not substantially above 0° C. and substantially free of said component; converting said component from said mixture in the gaseous state to the liquid phase and forming, with said scrubbing liquid, a liquid product during such contact; thereafter treating said liquid product to expel therefrom dissolved constituent more volatile than said component; and subsequently rectifying the liquid product to recover therefrom said hydrocarbon component.

GEORGE T. FELBECK.